(12) United States Patent
Howard et al.

(10) Patent No.: US 11,084,543 B2
(45) Date of Patent: Aug. 10, 2021

(54) ACTIVE AERO DEVICE TO ATTENUATE WIND THROB

(71) Applicants: Ford Global Technologies, LLC, Dearborn, MI (US); The Regents of the University of Michigan, Ann Arbor, MI (US)

(72) Inventors: Kevin Howard, Plymouth, MI (US); Robert Lietz, Chelsea, MI (US); John Romig, Troy, MI (US); Lawren Gamble, Ann Arbor, MI (US); Daniel Inman, Northport, MI (US); William S. Gulker, Beverly Hills, MI (US); Artem Poliakov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 15/916,048

(22) Filed: Mar. 8, 2018

(65) Prior Publication Data

US 2019/0276097 A1   Sep. 12, 2019

(51) Int. Cl.
*B62D 35/00* (2006.01)
*B60R 1/06* (2006.01)
*B60R 1/07* (2006.01)
*B62D 29/04* (2006.01)

(52) U.S. Cl.
CPC .............. *B62D 35/008* (2013.01); *B60R 1/06* (2013.01); *B60R 1/07* (2013.01); *B62D 29/04* (2013.01); *B60Y 2306/09* (2013.01); *B60Y 2410/13* (2013.01)

(58) Field of Classification Search
CPC .. B60R 1/006; B60R 1/06; B60R 1/07; B60R 1/12; B62D 35/008

USPC ................ 296/1.11, 180.1, 180.3, 180.5
See application file for complete search history.

(56) References Cited

U.S. PATENT DOCUMENTS

| | | | |
|---|---|---|---|
| 6,712,413 B1 * | 3/2004 | Flowerday | B60R 1/06 248/476 |
| 6,938,945 B2 | 9/2005 | Wald et al. | |
| 6,979,050 B2 | 12/2005 | Browne et al. | |
| 7,367,609 B2 | 5/2008 | Grudzinski et al. | |
| 7,530,625 B2 | 5/2009 | Gulker et al. | |

(Continued)

FOREIGN PATENT DOCUMENTS

| | | | |
|---|---|---|---|
| JP | 2000142493 | | 5/2000 |
| JP | 2000142493 A | * | 5/2000 |
| WO | 2016189448 | | 12/2016 |

OTHER PUBLICATIONS

English translation of JP 2000-142493; retreived Jul. 30, 2019 via PatentTranslate located at www.epo.org. (Year: 2019).*

(Continued)

*Primary Examiner* — Jason S Daniels
(74) *Attorney, Agent, or Firm* — David Coppiellie; Carlson, Gaskey & Olds, P.C.

(57) ABSTRACT

An apparatus and method, according to an exemplary aspect of the present disclosure includes, among other things, a composite material selectively movable between an inactive position and an active position, and a control to apply a voltage to the composite material in response to a vehicle panel moving from a closed position to an open position to move the composite material to the active position to mitigate wind throb.

26 Claims, 4 Drawing Sheets

(56) References Cited

U.S. PATENT DOCUMENTS

| | | | | |
|---|---|---|---|---|
| 7,641,275 B2* | 1/2010 | Campbell | ............... | B60J 1/20 |
| | | | | 296/180.1 |
| 7,744,147 B2* | 6/2010 | Jeong | ............... | B62D 35/008 |
| | | | | 296/180.5 |
| 8,226,152 B2* | 7/2012 | Calco | ............... | B60J 1/20 |
| | | | | 296/152 |
| 10,065,482 B1* | 9/2018 | Gur | ............... | B62D 35/008 |
| 2005/0121945 A1* | 6/2005 | Browne | ............... | B64C 3/48 |
| | | | | 296/180.1 |
| 2008/0290690 A1* | 11/2008 | Gulker | ............... | B60R 1/06 |
| | | | | 296/180.1 |
| 2016/0250911 A1* | 9/2016 | Satou | ............... | B60J 7/226 |
| | | | | 296/217 |
| 2018/0297451 A1* | 10/2018 | Banner | ............... | B62D 35/008 |

OTHER PUBLICATIONS

Ofori-Atta, Kelvin P., Morphing Wings Using Macro Fiber Composites, 2014, McNair Scholars Research Journal: vol. 1, Article 10. Available at: http://commons.erau.edu/mcnair/vol1/iss1/10.

Voelcker, John, Chevy Volt's Wind Thrumming Noise: Aero Fix Now Available, Dec. 9, 2013, Green Car Reports, retrieved from https://www.greencarreports.com/news/1088990_chevy-volts-wind-thrumming-noise-aero-fix-now-available on Jan. 19, 2018.

Walker, R. and Wei, W., "Optimization of Mirror Angle for Front Window Buffeting and Wind Noise Using Experimental Methods," SAE Technical Paper 2007-01-2401, 2007, https://doi.org/10.4271/2007-01-2401.

* cited by examiner

ACTIVE AERO DEVICE TO ATTENUATE WIND THROB

TECHNICAL FIELD

This disclosure relates to an exemplary apparatus and method of actively controlling a composite material device to deflect flow away from an open window to mitigate wind throb noise.

BACKGROUND

In addition to improving climate control efficiency in a vehicle interior cabin, there is a consistent trend to reduce interior noise, vibration, and harshness characteristics perceived by cabin occupants. This leads to vehicle interior cabins that are well sealed. One phenomena that occurs due to having a tightly sealed cabin is that when a single moveable glazing, e.g. side window, moon roof, etc., is opened while driving, an oscillation of air into and out of the cabin through the opening occurs at a low frequency in the audible decibel range. This generates a throbbing noise at a high decibel level, which can adversely affect occupant comfort and hearing.

One known method of mitigating this wind throb noise is to provide fixed kicker surfaces near the openings. However, this impacts the overall aerodynamic drag of the vehicle, resulting in a negative effect on fuel economy. Thus, it is desirable to reduce the wind throb noise with minimal effect on drag and fuel economy.

SUMMARY

An apparatus according to an exemplary aspect of the present disclosure includes, among other things, a composite material selectively movable between an inactive position and an active position, and a control to apply a voltage to the composite material in response to a vehicle panel moving from a closed position to an open position to move the composite material to the active position to mitigate wind throb.

In a further non-limiting embodiment of the foregoing apparatus, a power supply is configured to apply the voltage to the composite material.

In a further non-limiting embodiment of either of the foregoing apparatus, the vehicle panel comprises a window that covers an opening to a vehicle cabin.

In a further non-limiting embodiment of any of the foregoing apparatus, the composite material is mounted to a vehicle structure adjacent the opening.

In a further non-limiting embodiment of any of the foregoing apparatus, the vehicle structure comprises a pillar.

In a further non-limiting embodiment of any of the foregoing apparatus, the vehicle structure comprises a sail panel.

In a further non-limiting embodiment of any of the foregoing apparatus, the composite material lies flat against the vehicle structure when in the inactive position, and wherein the composite material deflects outwardly away from an outer surface of the vehicle structure when in the active position.

In a further non-limiting embodiment of any of the foregoing apparatus, the composite material deflects at least 10 mm away from the outer surface.

In a further non-limiting embodiment of any of the foregoing apparatus, the composite material deflects within a range of 18-20 mm away from the outer surface.

In a further non-limiting embodiment of any of the foregoing apparatus, the composite material comprises a flat sheet of macro fiber composite material having at least one portion held fixed relative to the outer surface and another portion freely moveable relative to the outer surface.

In a further non-limiting embodiment of any of the foregoing apparatus, the composite material is only moved to the active position when the window is open.

An apparatus according to another exemplary aspect of the present disclosure includes, among other things, a vehicle structure adjacent a panel covering an opening into a vehicle cabin, a composite material mounted to the vehicle structure and responsive to a voltage to move to an active position, and a control which applies the voltage in response to the vehicle panel moving to uncover the opening to move the composite material to the active position and mitigate wind throb.

In a further non-limiting embodiment of any of the foregoing apparatus, the composite material comprises a sheet of macro fiber composite material including a plurality of piezoelectric fibers within an elastic structure.

In a further non-limiting embodiment of any of the foregoing apparatus, the vehicle panel comprises a window and the vehicle structure comprises at least one of a pillar and sail panel.

In a further non-limiting embodiment of any of the foregoing apparatus, the composite material lies flat against the vehicle structure when in an inactive position, and wherein the composite material deflects outwardly away from an outer surface of the vehicle structure when in the active position.

In a further non-limiting embodiment of any of the foregoing apparatus, the control only moves the composite material to the active position when the window is open, and wherein the control ceases to supply voltage to the composite material when the opening is covered by the panel.

A method according to another exemplary aspect of the present disclosure includes the steps of, among other things: providing a composite material that is selectively movable relative to a vehicle structure between an inactive position and an active position; and applying a voltage to the composite material in response to a vehicle panel moving from a closed position to an open position to move the composite material to the active position to mitigate wind throb.

In a further non-limiting embodiment of the foregoing method, the vehicle panel comprises a window that covers an opening to a vehicle cabin, and the method includes mounting the composite material to the vehicle structure adjacent the opening such that the composite material lies flat against the vehicle structure when in the inactive position and deflects outwardly away from an outer surface of the vehicle structure when in the active position.

In a further non-limiting embodiment of either of the foregoing methods, the method includes automatically moving the composite material to the active position only when the vehicle panel is open and automatically controlling a voltage supply to return the composite material to the inactive position when the vehicle panel is closed.

In a further non-limiting embodiment of any of the foregoing methods, the composite material comprises a sheet of macro fiber composite material including a plurality of piezoelectric fibers within an elastic structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary apparatus and methods of actively controlling a composite device to deflect flow away from an open window to mitigate wind throb noise. These and other features are discussed in greater detail in the following paragraphs of this detailed description.

Figure 1:
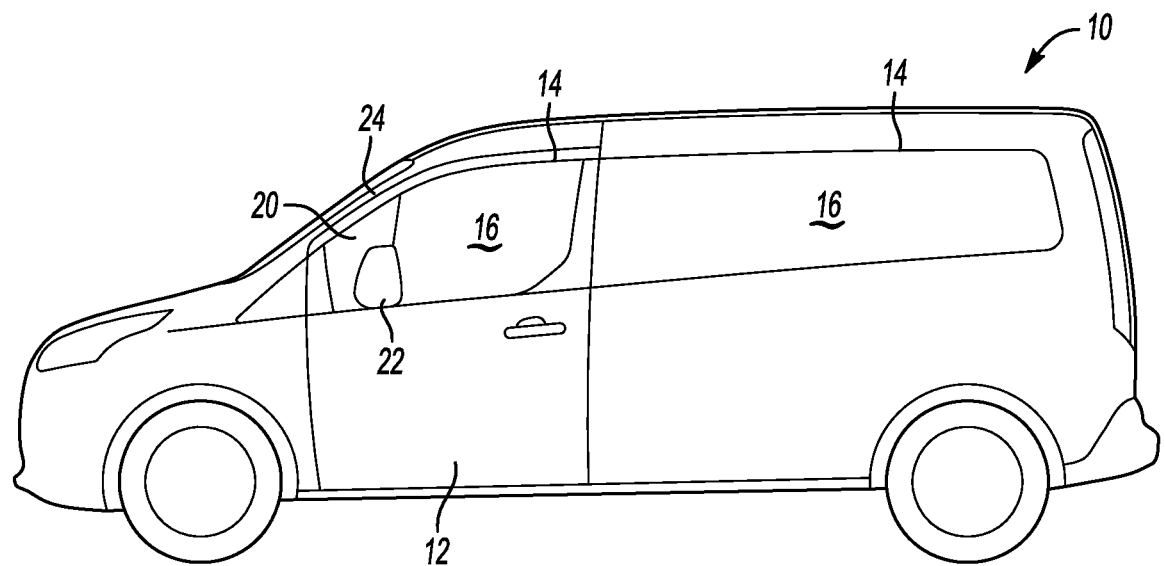
FIG. 1 is a schematic representation of a vehicle incorporating a device to mitigate wind noise.
Figure 2:
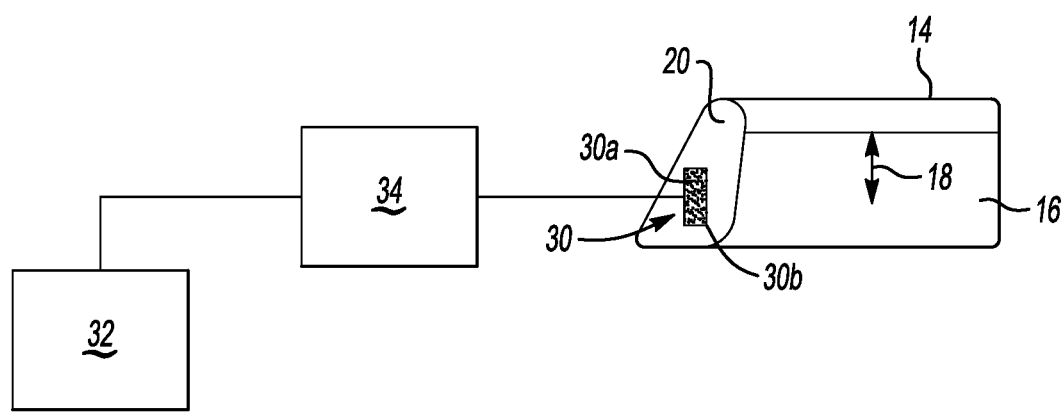
FIG. 2 is a schematic diagram of a control system to control the device.

FIG. 1 shows a vehicle 10 with a door 12 that is moveable between an open and closed position to provide access to a vehicle interior or passenger cabin. The vehicle 10 includes one or more openings 14 that receive a vehicle panel 16, such as a glazing, window, moon roof, sun roof, etc. for example, that can be moved as indicated at 18 (FIG. 2) to cover/close and uncover/open the associated opening 14. In one example configuration, a sail panel 20 is used to facilitate mounting of a rear-view mirror 22 to an A-pillar 24 adjacent to at least one side window 16.

One phenomena that occurs due to having a tightly sealed cabin is that when a single window 16 is opened while driving, an oscillation of air into and out of the cabin through the opening 14 occurs at a low frequency in the audible decibel range, which can result in an undesirable throbbing noise. The subject invention provides an aero device comprising a composite material 30 that is selectively movable between an inactive position and an active position to mitigate this throbbing noise. A control 32 is configured to apply a voltage to the composite material 30 in response to the vehicle panel 16 moving from a closed position to an open position. The control 32 is in communication with a power supply 34 which is used to apply the voltage. When the voltage is applied to the composite material 30, the material 30 automatically moves to the active position to mitigate wind noise. When in the active position, a portion of the flow F is directed away from the opening 14 to reduce noise.

Figure 3:
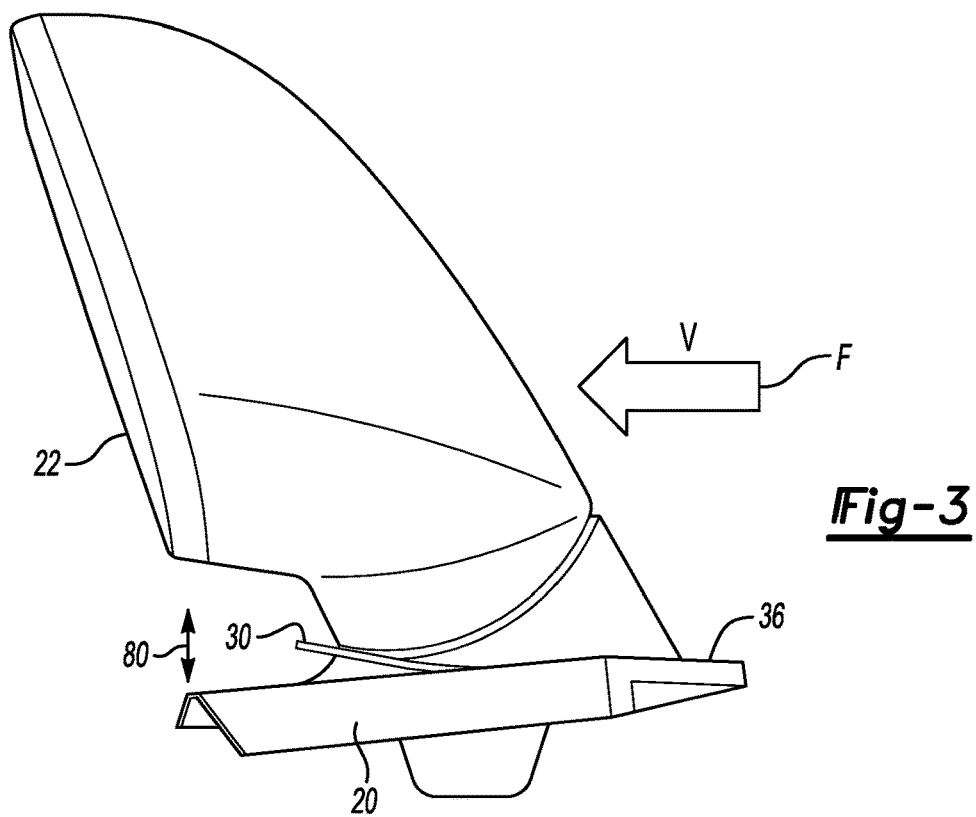
FIG. 3 shows a top view of a mirror from FIG. 1 and shows the device in an active position.
Figure 4:
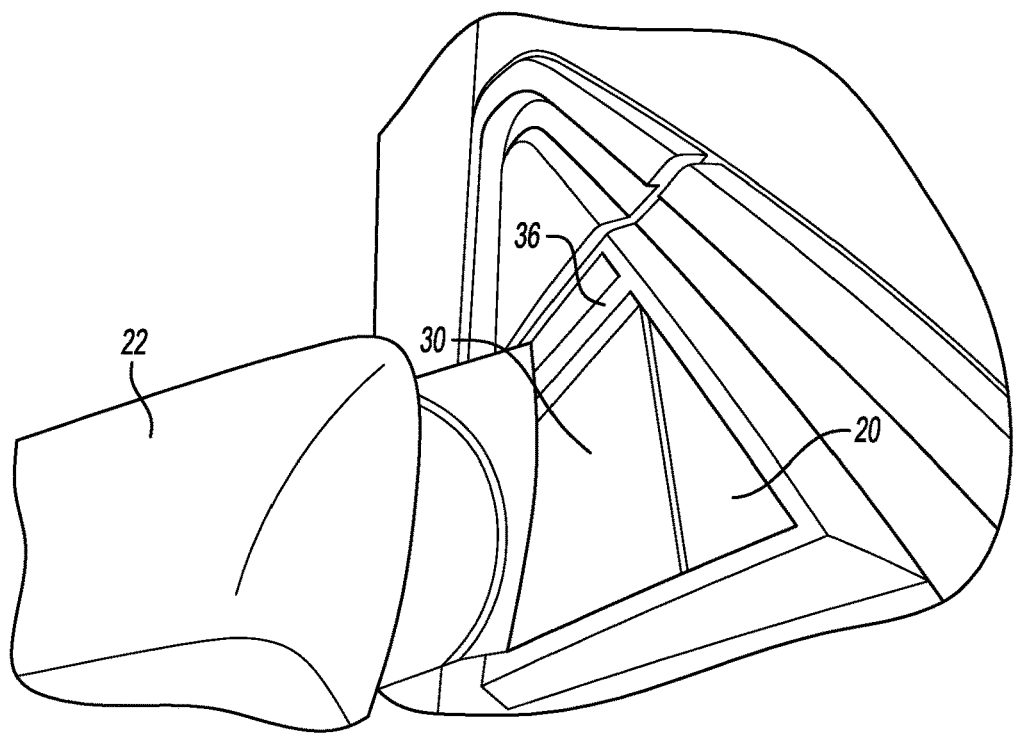
FIG. 4 is a side view of a mirror from FIG. 1 and shows the device in an inactive position.

In one example, the composite material 30 is mounted to the sail panel 20 adjacent to the opening 14. FIG. 3 shows the composite material in the active position where a portion of the material 30 has been deflected away from an outer surface 36 of the sail panel 20. Application of the voltage to the material 30 causes the material to deflect away from the outer surface 36 to change the direction of flow past the opening 14. FIG. 4 shows the composite material 30 in the inactive position, lying flat against the outer surface 36. When voltage is no longer supplied to the material 30 it returns to a flat position against the surface 36. It should be understood that while the composite material 30 is shown as being mounted to the sail panel 20, the material 30 could also be mounted to vehicle structures at other locations, in addition to, or in place of the material 30 mounted to the sail panel 20. For example, the composite material 30 could also be mounted to the A-pillar 24, B-pillar 26, etc.

Figure 5:
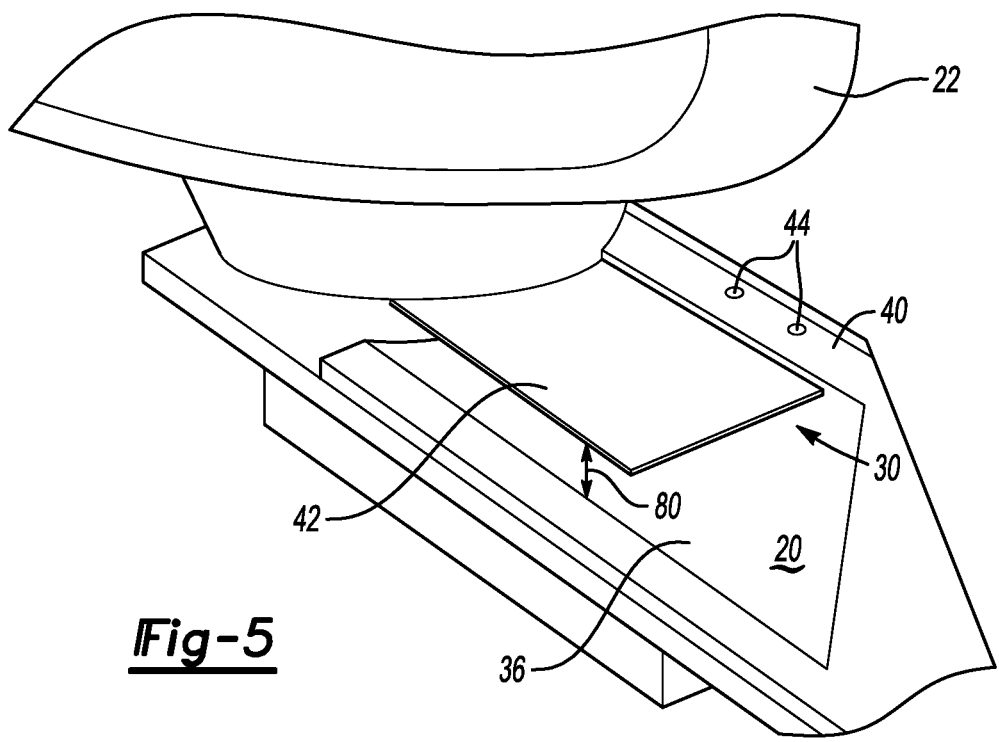
FIG. 5 shows one example of a mounting configuration for the device which is shown in the active position.
Figure 6:
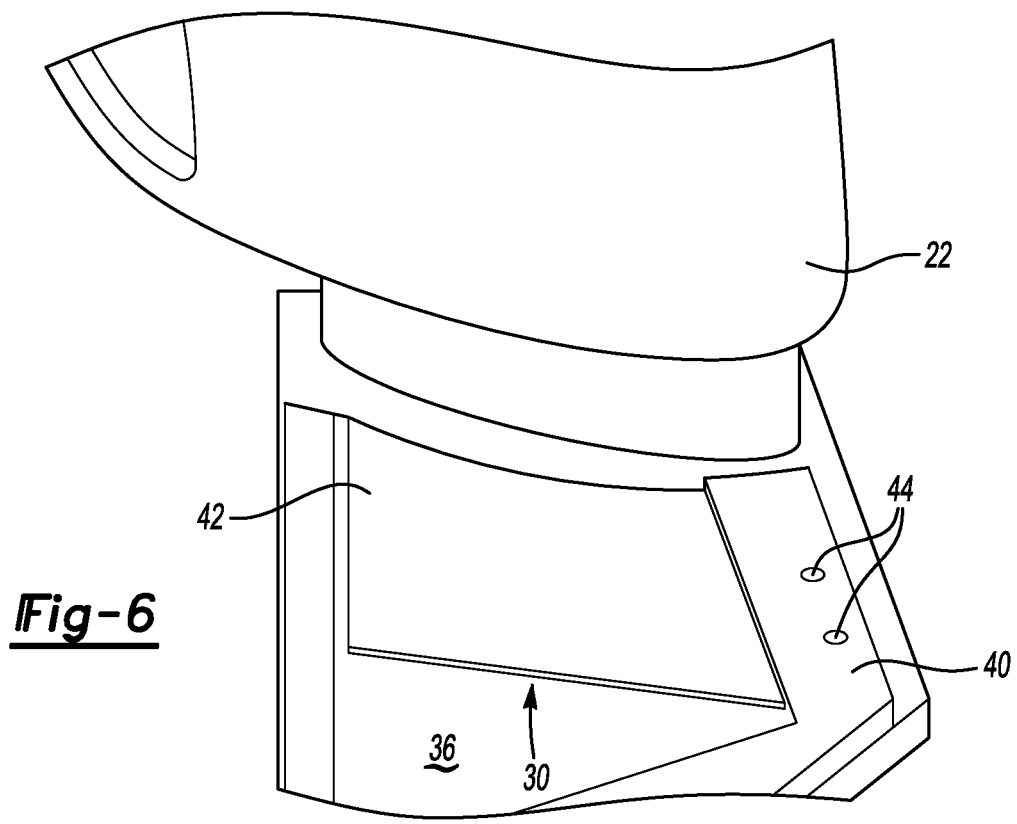
FIG. 6 shows the device of FIG. 5 in the inactive position.

FIGS. 5-6 show one example of a mounting configuration for the composite material 30. In this example, the composite material 30 has at least one portion 40 held fixed relative to the outer surface 36 of the sail panel 20 and another portion 42 freely moveable relative to the outer surface 36 of the sail panel 20. In one example, one or more fasteners 44 are used to secure the composite material 30 to the sail panel 20. A cover or sheet made from the same material as the sail panel can be used to cover the fasteners 44 to provide an aesthetically pleasing appearance.

In one example, the composite material 30 comprises a sheet of macro fiber composite (MFC) material including a plurality of piezoelectric fibers 30a within an elastic structure 30b. Upon application of the voltage, the composite material 30 is configured such that the portion 42 pivots or deflects away from the outer surface 36 as shown in FIG. 3. The amount of deflection is adjustable and is controlled by the amount of voltage applied to the MFC, as well as by the constraint location and method. The properties of the substrate material for the elastic structure 30b can be tailored to fit desired curvature orientations and/or desired deflection shapes.

The control 32 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The control 32 may be a hardware device for executing software, particularly software stored in memory that may include one or more separate programs, each of which includes an ordered listing of executable instructions for implementing logical functions. The controller 32 can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.).

Figure 7:
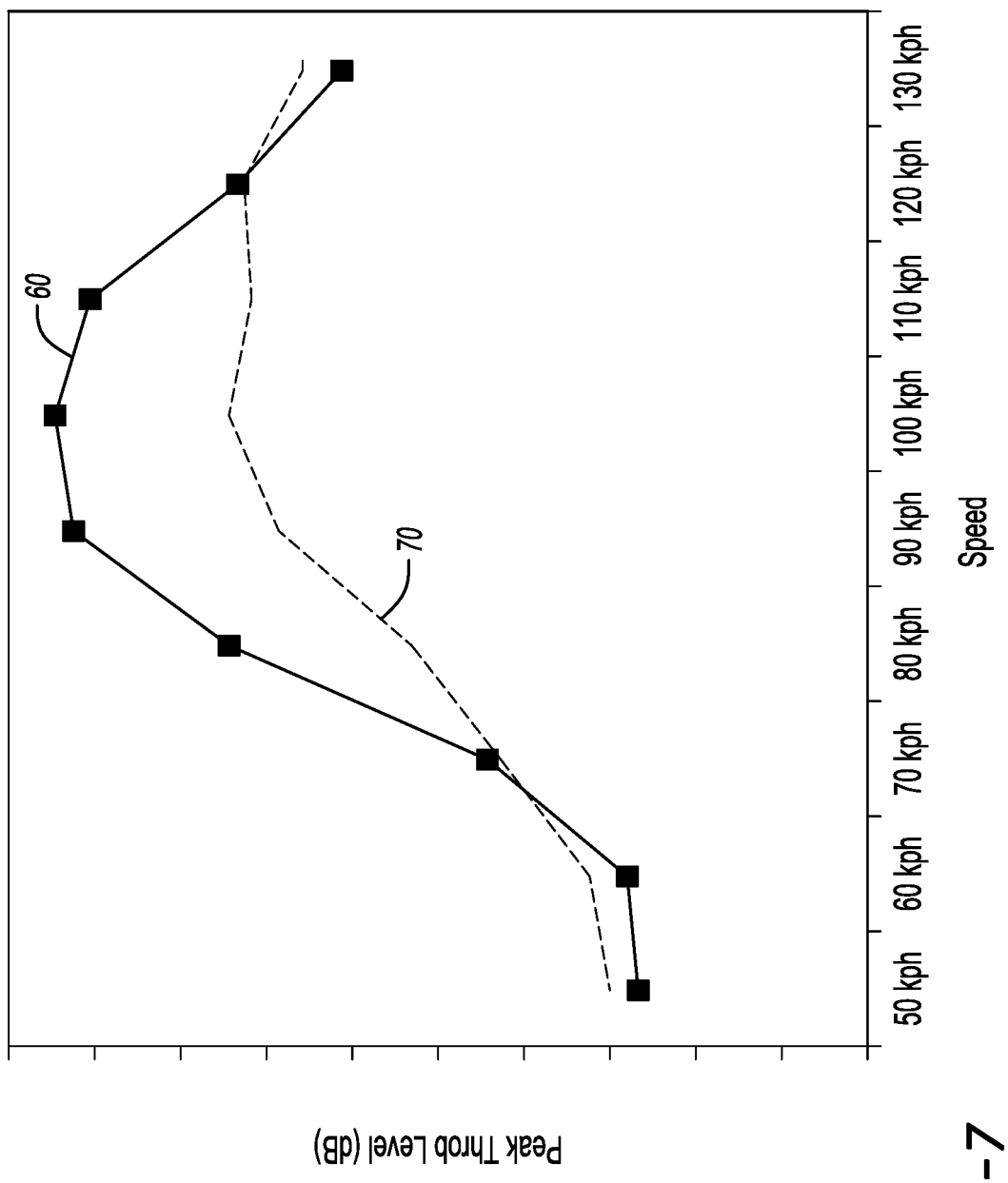
FIG. 7 is a graph that displays decibel level vs. speed for a flat sail panel and a configuration incorporating the subject invention.

One advantage of using MFC material is that is easy to package and does not require a significant amount of power. Thus, the control system can utilize a relatively small electronic board which further facilitates packaging the system into the vehicle. FIG. 7 shows one example of a comparison of a flat sail panel 20 without the composite material to a configuration that utilizes the composite material. The graph depicts peak increasing throb levels in decibels on the y-axis vs. increasing Speed (kph) on the x-axis at a yaw of zero degrees. The flat sail panel 20 without the composite material 30 is indicated at 60, while the configuration that utilizes the composite material 30 is indicated at 70. In the example shown, the configuration with the composite material 30 reduces the throb noise by at least 10 decibels at the peak location as compared to the sail panel 20 without the composite material.

In one example, the amount of deflection 80 (FIG. 3) is at least 10 mm away from the outer surface 36 of the sail panel 20. In one further example, the composite material 30 deflects within a range of 18-20 mm away from the outer surface 36 to provide the desired amount of sound reduction. It should be understood that these are just examples, and that other deflection ranges could be utilized dependent upon application and location on the vehicle.

The subject invention utilizes an actively controlled fiber composite material to deflect flow away from an open window area. The device is only activated when the window is open, which results in a lower drag coefficient when the window is closed. The closed window position is the primary operating condition and thus as the device is only deployed when the window is open, fuel economy is improved. In one example, the flat sheet of material 30 is approximately 2 mm in thickness, which provides for a very compact aero actuator device that is embedded and/or mounted into an existing space in the sail panel at the base of the A-pillar or other corresponding vehicle structure. The fiber composite material is actuated using a relatively low electrical power so that it can simply be connected to the existing 12 volt electrical system of the vehicle, which facilitates a reduction in system complexity.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
   a composite material selectively movable between an inactive position and an active position, wherein the composite material comprises a flat sheet of composite material mounted to a vehicle exterior surface and having at least a first portion held fixed relative to an opening on the vehicle exterior surface and a second portion freely moveable relative to the first portion;
   a cover member to cover the first portion; and
   a control to apply a voltage to the composite material in response to a vehicle panel moving from a closed position to an open position to move the second portion of the composite material to the active position to mitigate wind throb.

2. The apparatus according to claim 1, a power supply configured to apply the voltage to the composite material.

3. The apparatus according to claim 1, wherein the vehicle panel comprises a window that covers the opening to a vehicle cabin.

4. The apparatus according to claim 3, wherein the composite material is mounted to a vehicle structure having the vehicle exterior surface adjacent the opening.

5. The apparatus according to claim 4, wherein the vehicle structure comprises a pillar.

6. The apparatus according to claim 4, wherein the vehicle structure comprises a sail panel.

7. The apparatus according to claim 4, wherein the second portion of the composite material lies flat against the vehicle structure when in the inactive position, and wherein the second portion of the composite material deflects outwardly away from vehicle exterior surface of the vehicle structure when in the active position, and wherein one or more fasteners are used to secure the first portion of the composite material directly to the vehicle structure, and wherein the cover member covers the one or more fasteners and is made from a common material as that of the vehicle structure.

8. The apparatus according to claim 7, wherein the second portion of the composite material deflects at least 10 mm away from the outer surface.

9. The apparatus according to claim 8, wherein the second portion of the composite material deflects within a range of 18-20 mm away from the outer surface.

10. The apparatus according to claim 7, wherein the flat sheet of composite material comprises a flat sheet of macro fiber composite material including a plurality of piezoelectric fibers within an elastic structure.

11. The apparatus according to claim 3, wherein the second portion of the composite material is only moved to the active position when the window is open.

12. The apparatus according to claim 1, wherein the vehicle exterior surface comprises a vehicle structure that forms a pillar or sail panel, and wherein the flat sheet of composite material comprises a flexible sheet of material that lies flat against the pillar or sail panel when in the inactive position and that has an amount of deflection that is controlled by an amount of voltage applied through the flexible sheet of material such that the voltage is directly applied to the flexible sheet of material to move the flexible sheet of material to the active position such that the air flow is directed in a direction opposite from the vehicle panel.

13. The apparatus according to claim 1, wherein the vehicle panel comprises a window that covers the opening to a vehicle interior, and including mounting the composite material to a vehicle structure immediately adjacent the opening such that the composite material lies flat against the vehicle structure when in the inactive position and deflects outwardly away from an outer surface of the vehicle structure when in the active position, and wherein the control moves the composite material to the active position when the window immediately adjacent to the composite material moves to an open position such that the air flow is directed in a direction opposite from the opening.

14. An apparatus, comprising:
   a vehicle structure adjacent a panel covering an opening into a vehicle cabin;
   a composite material mounted to the vehicle structure and responsive to a voltage to move to an active position, wherein the composite material comprises a flat sheet of composite material having at least a first portion held fixed relative to an outer surface of the vehicle structure and a second portion freely moveable relative to the first portion, and wherein the panel comprises a window and the vehicle structure comprises at least one of a pillar and sail panel;
a cover member to cover the first portion; and
a control which applies the voltage in response to the panel moving to uncover the opening to move the second portion of the composite material to the active position and mitigate wind throb.

15. The apparatus according to claim 14, wherein the flat sheet of composite material comprises a sheet of macro fiber composite material including a plurality of piezoelectric fibers within an elastic structure.

16. The apparatus according to claim 14, wherein the first portion is fixed to the outer surface of the at least one of the pillar and sail panel.

17. The apparatus according to claim 14, wherein the second portion of the composite material lies flat against the vehicle structure when in an inactive position, and wherein the second portion of the composite material deflects outwardly away from an outer surface of the vehicle structure when in the active position, and wherein one or more fasteners are used to secure the first portion of the composite material directly to the vehicle structure, and wherein the cover member covers the one or more fasteners and is made from a common material as that of the vehicle structure.

18. The apparatus according to claim 14, wherein the control only moves the second portion of the composite material to the active position when the window is open, and wherein the control ceases to supply voltage to the second portion of the composite material when the opening is covered by the panel.

19. The apparatus according to claim 14, wherein the flat sheet of composite material comprises a flexible sheet of material that lies flat against the pillar or sail panel when in the inactive position and that has an amount of deflection that is controlled by an amount of voltage applied through the flexible sheet of material such that the voltage is directly applied to the flexible sheet of material to move the second portion of the flexible sheet of material to the active position such that the air flow is directed in a direction opposite from the panel.

20. The apparatus according to claim 14, wherein the panel comprises a window that covers an opening to a vehicle interior, and including mounting the composite material to the vehicle structure immediately adjacent the opening such that the composite material lies flat against the vehicle structure when in the inactive position and deflects outwardly away from an outer surface of the vehicle structure when in the active position, and wherein the control moves the composite material to the active position when the window immediately adjacent to the composite material moves to an open position such that the air flow is directed in a direction opposite from the opening.

21. A method, comprising:
providing a composite material that is mounted to an outer surface of a vehicle structure and is selectively movable relative to the vehicle structure between an inactive position and an active position, wherein the composite material comprises a flat sheet of composite material having at least a first portion held fixed relative to an outer surface of the vehicle structure and a second portion freely moveable relative to the first portion, wherein the vehicle structure comprises at least one of a pillar and sail panel;
covering the first portion with a cover member; and
applying a voltage to the composite material in response to a vehicle panel moving from a closed position to an open position to move the second portion of the composite material to the active position to mitigate wind throb.

22. The method according to claim 21, wherein the vehicle panel comprises a window that covers an opening to a vehicle cabin, and including mounting the composite material to the vehicle structure adjacent the opening such that the second portion of the composite material lies flat against the vehicle structure when in the inactive position and deflects outwardly away from an outer surface of the vehicle structure when in the active position, and including securing the first portion of the composite material directly to the vehicle structure with one or more fasteners, and covering the one or more fasteners with the cover member that is made from a common material as that of the vehicle structure.

23. The method according to claim 21, including automatically moving the second portion of the composite material to the active position only when the vehicle panel is open and automatically controlling a voltage supply to return the second portion of the composite material to the inactive position when the vehicle panel is closed.

24. The method according to claim 21, wherein the flat sheet of composite material comprises a sheet of macro fiber composite material including a plurality of piezoelectric fibers within an elastic structure.

25. The method according to claim 21, wherein the vehicle panel comprises a window that covers an opening to a vehicle cabin, and including mounting the composite material to the vehicle structure immediately adjacent the opening such that the composite material lies flat against the vehicle structure when in the inactive position and deflects outwardly away from an outer surface of the vehicle structure when in the active position, and including moving the composite material to the active position when the window immediately adjacent to the composite material moves to an open position such that the air flow is directed in a direction opposite from the opening.

26. The method according to claim 25, wherein the flat sheet of composite material comprises a flexible sheet of material that has an amount of deflection that is controlled by an amount of voltage applied through the flexible sheet of material, and including applying the voltage directly to the flexible sheet of material to move the flexible sheet of material to the active position.

* * * * *

UNITED STATES PATENT AND TRADEMARK OFFICE
CERTIFICATE OF CORRECTION

PATENT NO. : 11,084,543 B2  
APPLICATION NO. : 15/916048  
DATED : August 10, 2021  
INVENTOR(S) : Howard et al.

Page 1 of 1

It is certified that error appears in the above-identified patent and that said Letters Patent is hereby corrected as shown below:

In the Claims

In Claim 7, Column 6, Line 15; replace "away from vehicle exterior" with --away from the vehicle exterior--

In Claim 8, Column 6, Line 23; replace "the outer surface" with --the vehicle exterior surface--

In Claim 9, Column 6, Line 26; replace "the outer surface" with --the vehicle exterior surface--

In Claim 12, Column 6, Line 43; replace "such that the air flow" with --such that air flow--

In Claim 13, Column 6, Line 55; replace "such that the air flow" with --such that air flow--

In Claim 19, Column 7, Line 34-35; replace "when in the inactive position" with --when in an inactive position--

In Claim 19, Column 7, Line 40; replace "such that the air flow" with --such that air flow--

In Claim 20, Column 7, Line 49; replace "when in the active position" with --when in an inactive position--

In Claim 20, Column 7, Line 52; replace "such that the air flow" with --such that air flow--

In Claim 25, Column 8, Line 47; replace "such that the air flow" with --such that air flow--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*